Oct. 3, 1933.                J. S. DRUMMOND                1,928,884
                              POWER TAKE-OFF
                         Filed Aug. 21, 1931              2 Sheets-Sheet 1
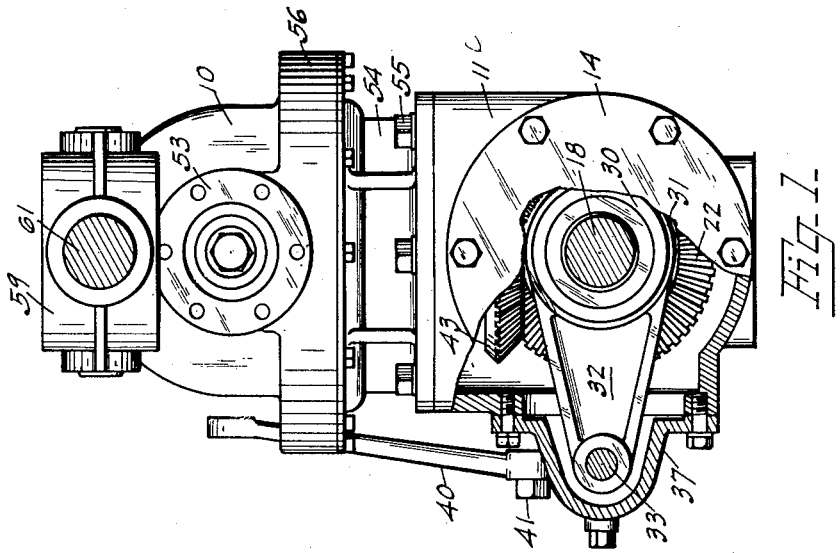
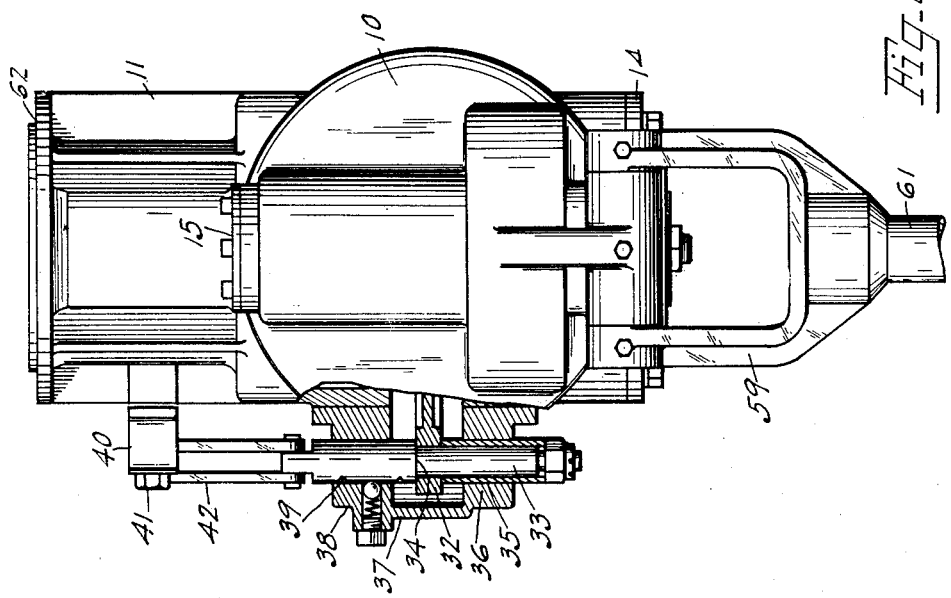
INVENTOR.
James S. Drummond
BY
Harry C. Schroeder
ATTORNEYS.

Patented Oct. 3, 1933

1,928,884

UNITED STATES PATENT OFFICE 1,928,884

POWER TAKE-OFF

James S. Drummond, San Leandro, Calif.

Application August 21, 1931. Serial No. 558,501

6 Claims. (Cl. 180—14)

This invention is a power take-off which is especially adapted for use with tractors and equipment drawn thereby.

The main object of the invention is to provide a power take-off for tractors which may be coupled directly to the engine to form a part thereof.

A second object of the invention is to provide a power take-off with reversing means, so as to permit driving therefrom in either direction.

A third object of the invention is to provide such a device with swivel means whereby the device will align both, with the tractor and the equipment drawn thereby, irrespective of the irregular course followed.

Other objects and advantages of the invention will become apparent as the following description is read on the drawings forming a part of this specification and in which similar reference characters are used to designate similar parts throughout the several views and in which;

Fig. 1 is a drive end elevation of the invention shown partly in section.

Fig. 2 is a top plan view of the invention shown partly in section.

Figure 3:
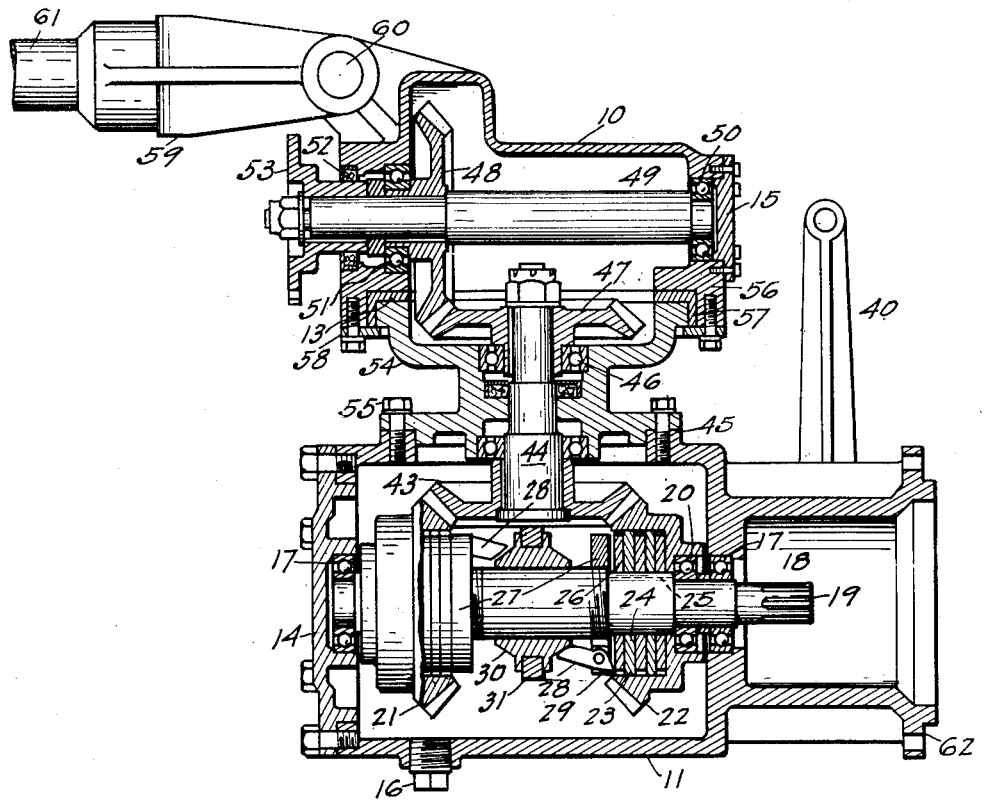
Fig. 3 is a longitudinal sectional elevation through the invention.

The housing is made in two parts, consisting of an upper housing or section 10 and a lower housing or section 11 secured together by a vertical shaft 44 and swiveled on a bearing 13.

An end cover plate 14 provides access to the lower housing, and an end cover plate 15 provides access to the upper housing. A drain plug 16 provides for drainage of oil from the lower housing.

Rotatably mounted in ball bearings 17 is a shaft 18 having a splined end 19 for coupling to one of the motor shafts, such as the crankshaft, oil pump shaft or cam shaft.

Rotatably mounted on shaft 18 by means of ball bearings 20 are two bevel gears 21 and 22, these gears being counterbored and being provided with keys 23 to receive disks 24 of the usual disk clutch construction, and shaft 18 is keyed as at 25 to receive the cooperating disks 26. A collar 27 is adjustably secured to the shaft 18 and has a plurality of dogs 28 pivoted as at 29 for compressing the disks.

A collar 30 is slidably mounted on shaft 18 and has rotatably mounted thereon a clutch shifter collar 31 which is integral with an arm 32, the outer end of which is fixed on a sliding shaft 33, and secured between the shoulder 34 and a sleeve 35, the sleeve 35 being slidable in a bearing 36 forming an integral part of housing 37.

A spring urged ball cooperates with indents 39 formed in the shaft 33 for positioning the collar in neutral and forward and reverse driving positions. An actuating lever 40 is pivoted at 41 to the housing 11. Links 42 connect between the lower end of lever 40 and the end of shaft 33.

A bevel gear 43 is constantly in mesh with bevel gears 21 and 22 and is adapted to be driven by either one of them and is secured on the vertical shaft 44 which is suitably mounted in ball bearings 46 in the connection between the upper housing 10 and lower housing 11.

Secured to the upper end of shaft 44 is a bevel gear 47 which meshes with a bevel gear 48 on a shaft 49 which is rotatably mounted in ball bearings 50 and 51, the gear 48 being fixed on shaft 49.

Suitable packing 52 is provided for shaft 49.

A coupling 53 is secured to the outer end of shaft 49, being the driven end from which power is transmitted through suitable shafting to remote devices.

The upper housing consists of a connection 54 which is suitably bolted as at 55 to the top of the lower housing 11. The upper face 13 provides a circular bearing seat for the upper section 56, and a flanged bushing 57 cooperates between the upper and lower sections 56 and 54. A clamp plate 58 retains the upper section 56 on the lower section 54 and permits a rotary or swivel movement of the upper section 56 relative to the lower section.

A yoke 59 is pivotally secured at 60 to the upper section 56, and through the rod 61 connected to the device or follower, keeps the shaft 49 in alignment with the driven device.

A suitable flange 62 provides means for attachment to the motor or other power device.

It will be noted that no universal joints are required, that the device swivels and aligns itself by means of the rod 61.

The operation and installation of the device is as follows; Shaft 18 is coupled to one of the driven shafts of a motor or other source of power, and the flange 62 is bolted to the motor or other housing or support. The other end of rod 61, not shown, is connected to the device to be driven or to the follower, and the coupling 53 is connected to the drive shaft of the device to be driven.

With lever 40 in intermediate position, the take-off runs idle, as neither gear 21 or 22 is driven, as neither of the clutches are in engagement.

Shifting lever 40, as viewed in Fig. 3 counterclockwise, the dogs 28 engage the tapered surface of collar 30 and compress the disks 24 and 26, driving gear 43 in one direction, which through shaft 44 and gears 47 and 48 drive shaft 49 in the same direction as shaft 18. By shifting lever 40 in the other direction, gear 22 is driven and changes the direction of rotation of shaft 49.

As the follower is swung out of alignment with the tractor, the rod 61 keeps the shaft 49 in alignment with the follower, the swiveling action taking place at the joint 13.

It will be noted that variations in construction and arrangement of parts which are consistent with the appended claims may be resorted to without detracting from the spirit or scope of the invention or sacrificing any of the advantages thereof.

I claim:

1. A power take-off comprising a lower housing provided with a mounting flange at one end, a removable cover at the other end, and, an intermediately disposed dividing wall, a drive shaft in said housing rotatably mounted in bearings in said cover and said dividing wall and projecting through said dividing wall, a pair of opposed bevel pinions rotatably mounted on said drive shaft, a disc clutch cooperating with each bevel pinion, means for selectively operating said clutches, an intermediate shaft, a bevel gear meshing with said bevel pinions and fixedly mounted on one end of said intermediate shaft, a bearing for said intermediate shaft, a bearing support, said bearing support being removably mounted on the top of said lower housing, said bearing support being an integral annular concentric flange forming an annular bearing seat, an upper housing rotatably mounted on said annular concentric flange, a driven shaft rotatably mounted in said upper housing in right angular relation to said intermediate shaft, a pair of bevel gears cooperating between said intermediate shaft and said driven shaft, a yoke pivotally secured to said housing on a transverse axis as related to the axis of said driven shaft.

2. A power take-off comprising a lower housing provided with a mounting flange at one end, a removable cover at the other end, and an intermediately disposed dividing wall, a drive shaft in said housing rotatably mounted in bearings in said cover and said dividing wall and projecting through said dividing wall, a pair of opposed bevel pinions rotatably mounted on said drive shaft, a disc clutch cooperating with each bevel pinion, means for selectively operating said clutches, an intermediate shaft, a bevel gear meshing with said bevel pinions and fixedly mounted on one end of said intermediate shaft, a bearing for said intermediate shaft, a bearing support, said bearing support being removably mounted on the top of said lower housing, said bearing support having a bevel gear receiving recess formed in the upper end thereof, the walls of the recess terminating in an annular concentric flange, an upper housing rotatably mounted on said annular concentric flange, said upper housing having an annular recess formed in the under-surface to receive said annular concentric flange, a mitre gear fixedly mounted on the other end of said intermediate shaft, a driven shaft rotatably mounted in said upper housing in right angular relation to said intermediate shaft, a mating mitre gear meshing with said mitre gear and fixedly mounted on said driven shaft, and a yoke pivotally secured to said housing on a transverse axis as related to the axis of said driven shaft.

3. A power take-off comprising a lower housing provided with a mounting flange at one end, a removable cover at the other end, and an intermediately disposed dividing wall, a drive shaft in said housing rotatably mounted in bearings in said cover and said dividing wall and projecting through said dividing wall, a pair of opposed bevel pinions rotatably mounted on said drive shaft, a disc clutch cooperating with each bevel pinion, means for selectively operating said clutches, an intermediate shaft, a bevel gear meshing with said bevel pinions and fixedly mounted on one end of said intermediate shaft, a bearing for said intermediate shaft, a bearing support, said bearing support being removably mounted on the top of said lower housing, said bearing support having a bevel gear receiving recess formed in the upper end thereof, the walls of the recess terminating in an annular concentric flange, an upper housing rotatably mounted on said annular concentric flange, said upper housing having an annular recess formed in the under-surface to receive said annular concentric flange, a bearing disposed within said annular recess over said annular concentric flange, a ring movably secured to the bottom of said upper housing and cooperating with the under-surface of said annular concentric flange, thereby forming a circular gib, a mitre gear fixedly mounted on the other end of said intermediate shaft, a driven shaft rotatably mounted in said upper housing in right angular relation to said intermediate shaft, a mating mitre gear meshing with said mitre gear and fixedly mounted on said driven shaft, and a yoke pivotally secured to said housing on a transverse axis as related to the axis of said driven shaft, for controlling the rotative movement of the upper housing.

4. A power take-off comprising a substantially cylindrical horizontally disposed housing provided with an intermediate dividing wall, a removable cover at one end, an annular mounting flange provided with centering means at the other end, and an intermediate shaft bearing seat formed on the top and encompassing a gear removal opening in the cylinder wall, a drive shaft in said housing rotatably mounted in bearings in said cover and said dividing wall and projecting through said dividing wall, a pair of opposed bevel pinions rotatably mounted on said drive shaft, each of said bevel pinions having an axial clutch-receiving recess formed therein, a disc clutch cooperating with each bevel pinion, and mounted within said recess, means for selectively operating said clutches, an intermediate shaft, a bevel gear meshing with said bevel pinions and fixedly mounted on one end of said intermediate shaft, a bearing for said intermediate shaft, a bearing support removably mounted on said intermediate shaft bearing seat, said bearing support having a bevel gear receiving recess formed in the upper end thereof, the walls of said recess terminating in an annular concentric flange, an upper housing having an annular recess formed in the under-surface to receive said annular concentric flange, a driven shaft rotatably mounted in said upper housing in right angular relation to said intermediate shaft, a pair of bevel gears cooperating between said intermediate shaft and said driven shaft, and a yoke pivotally secured to said housing on a transverse axis as related to the axis of said driven shaft, to permit vertical reciprocation thereof, and to retain said intermediate shaft in alignment with a remote point.

5. A power take-off comprising an upper housing and a lower housing pivotally connected, a drive shaft in said lower housing, an intermediate shaft forming the pivot between the lower housing and the upper housing, a train of bevel gears cooperating between said shafts, and driven shaft aligning means comprising a yoke end arm pivotally connected to the upper housing on an axis transversely related to the driven shaft, whereby the pivotal movement of the upper housing may be controlled from a remote point.

6. A power take-off comprising an upper housing and a lower housing pivotally connected, a drive shaft in said lower housing, an intermediate shaft forming the pivot between the lower housing and the upper housing, a train of bevel gears cooperating between said shafts, and driven shaft aligning means comprising a yoke end arm pivotally connected to the upper housing on an axis transversely related to the driven shaft, whereby the pivotal movement of the upper housing may be controlled from a remote point, and means for reversing the direction of rotation of the intermediate shaft relative to the drive shaft.

JAMES S. DRUMMOND.